United States Patent
Rhodes et al.

[11] Patent Number: 6,158,499
[45] Date of Patent: Dec. 12, 2000

[54] METHOD AND APPARATUS FOR THERMAL ENERGY STORAGE

[75] Inventors: Richard O. Rhodes, San Francisco; Hollend F. Bishop, Livermore, both of Calif.

[73] Assignee: Fafco, Inc., Redwood City, Calif.

[21] Appl. No.: 09/221,265

[22] Filed: Dec. 23, 1998

[51] Int. Cl.[7] .................................................. F28D 17/00
[52] U.S. Cl. ..................... 165/10; 165/104.17; 165/902; 165/236; 62/434; 62/59
[58] Field of Search ............................... 165/10, 9.4, 236, 165/104.17, 902, 905; 62/434, 435, 437, 59, 393

[56] References Cited

U.S. PATENT DOCUMENTS

| | | | |
|---|---|---|---|
| 1,891,713 | 12/1932 | Jordan et al. ........................ | 165/236 |
| 2,193,837 | 3/1940 | Winther et al. ..................... | 165/236 |
| 4,509,344 | 4/1985 | Ludwigsen et al. . | |
| 4,584,843 | 4/1986 | Pronger, Jr. et al. . | |
| 4,656,836 | 4/1987 | Gilbertson . | |
| 4,809,513 | 3/1989 | Goldstein et al. . | |
| 4,815,527 | 3/1989 | Meckler . | |
| 4,827,735 | 5/1989 | Foley ................................... | 62/430 |
| 4,831,830 | 5/1989 | Swenson .............................. | 62/59 |
| 4,831,831 | 5/1989 | Carter et al. . | |
| 4,928,493 | 5/1990 | Gilbertson et al. . | |
| 5,059,228 | 10/1991 | Cheng . | |
| 5,063,748 | 11/1991 | Davis et al. . | |
| 5,072,596 | 12/1991 | Gilbertson et al. . | |
| 5,090,207 | 2/1992 | Gilbertson et al. . | |
| 5,139,549 | 8/1992 | Knodel et al. . | |
| 5,195,850 | 3/1993 | Davis et al. . | |
| 5,369,964 | 12/1994 | Mauer et al. . | |
| 5,381,671 | 1/1995 | Saito et al. . | |
| 5,390,501 | 2/1995 | Davis et al. . | |
| 5,571,232 | 11/1996 | Davis et al. . | |
| 5,944,089 | 8/1999 | Roland ................................. | 165/10 |

Primary Examiner—Ira S. Lazarus
Assistant Examiner—Terrell McKinnon
Attorney, Agent, or Firm—Beyer Weaver & Thomas, LLP

[57] ABSTRACT

Methods and apparatus for extracting stored thermal energy using a combined internal and external melt cycle are disclosed. The present invention relates, in one aspect, to a heat exchange system which uses both an internal melt cycle and an external melt cycle to extract stored thermal energy. The heat exchange system includes a thermal energy storage medium and a heat exchanger which is in communication with the thermal energy storage medium. The heat exchanger is arranged to hold a heat exchange liquid and to facilitate the indirect transfer of heat between the heat exchange liquid and the thermal energy storage medium. The heat exchange system further includes a fluid supply which provides a fluid which directly contacts the thermal energy storage medium to transfer heat between the fluid and the thermal energy storage medium.

22 Claims, 6 Drawing Sheets

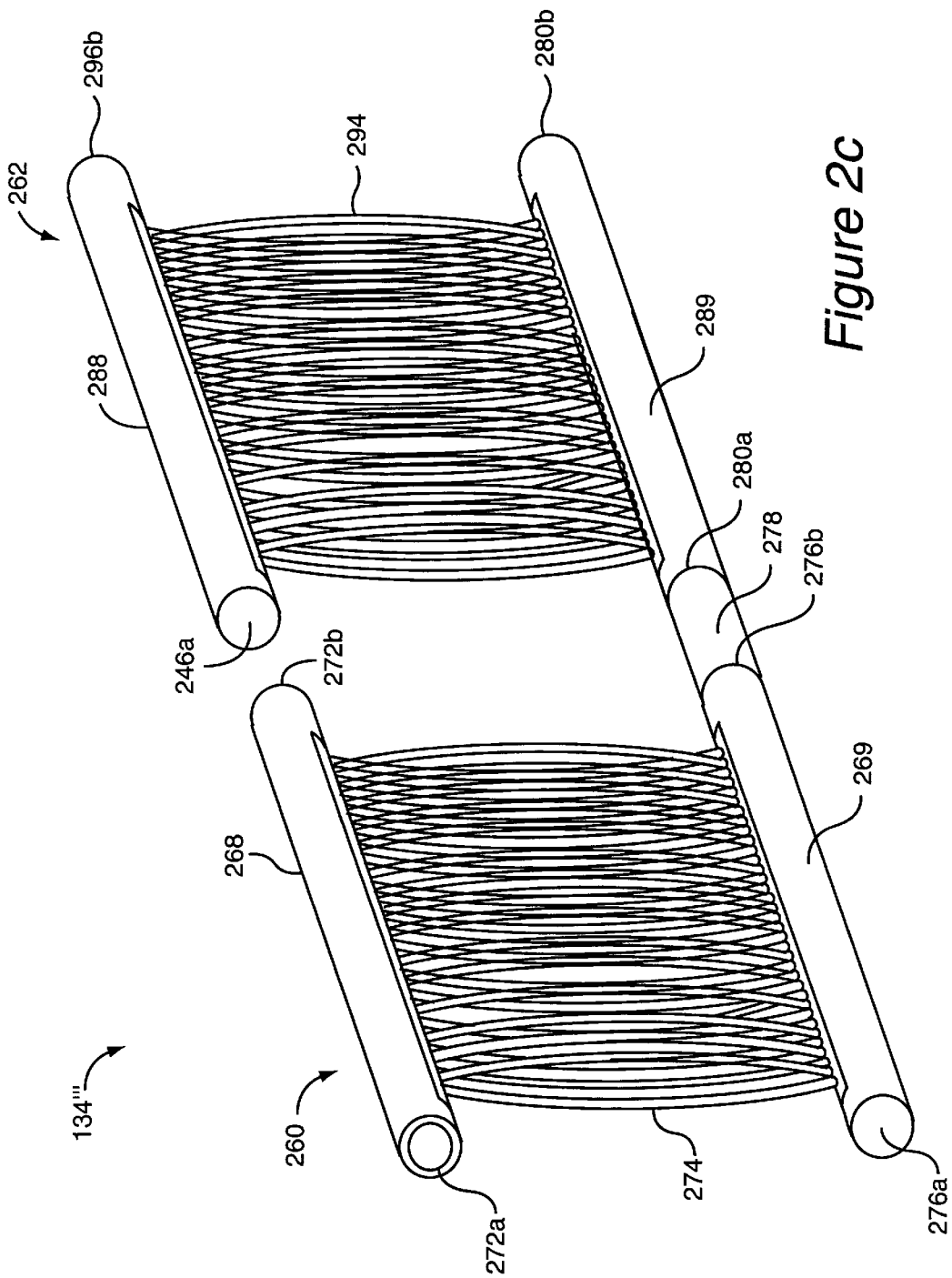

METHOD AND APPARATUS FOR THERMAL ENERGY STORAGE

BACKGROUND OF THE INVENTION

1. Field of Invention

The present invention relates generally to thermal energy storage systems. More particularly, the present invention relates to thermal energy storage systems which utilize a combined internal melt and external melt cycle.

2. Description of the Related Art

Thermal energy storage (TES) systems are used to store thermal energy for use at a later time for heating or cooling processes. For example, the use of TES systems enables electricity at off-peak demand hours to be used to freeze ice. The frozen ice may then be melted during peak electricity demand hours to provide cooling capabilities without significant usage of electricity during the peak demand hours. That is, TES systems are typically arranged to use electricity at off-peak energy demand periods to "store" energy for use during peak energy demand periods. As the efficient use of energy becomes more of a concern, the use thermal energy storage (TES) systems is becoming increasingly popular.

Heat exchangers are generally included as a part of a TES system. A heat exchanger may be arranged, for example, such that cooling liquid may be pumped through the heat exchanger to store energy in a thermal energy storage medium. Such "cold" energy storage is accomplished through cooling the thermal energy storage medium. The thermal energy storage medium is typically in the form of either a low-temperature fluid or a solid such as ice, and is in contact with the heat exchanger. After energy is stored in the thermal energy storage medium, at a later time, the thermal energy storage medium is used to provide chilled air for cooling purposes, as will be appreciated by those skilled in the art. For example, the chilled air may be used as a part of an air-conditioning system that is arranged to cool a building.

Melt cycles are used to melt the thermal energy storage medium to provide a cooled fluid that may be used as part of a cooling system. One melt cycle that is often used to melt a thermal energy storage medium is an internal melt cycle. An internal melt cycle involves melting the thermal energy storage medium, e.g., ice, by allowing a heat exchange fluid to come into indirect contact with the ice. By way of example, a heat exchange fluid which is at a higher temperature than the ice may be pumped through pipes, or enclosed pathways, which are in contact with the ice. As the heat exchange fluid is pumped through the pipes, the ice melts, and the heat exchange fluid cools. The cooled heat exchange fluid is then used as part of a cooling system that is associated with the TES system.

Although an internal melt cycle serves the purpose of providing a cooled heat exchange fluid that may be used as part of a cooling system, the use of an internal melt cycle is not always efficient. Specifically, the heat exchange fluid flows through a pipe and, therefore, does not come into direct contact with the ice. Accordingly, the overall heat transfer between the ice and the heat exchange fluid is affected by both the pipe and the space created between the pipe and the ice as the ice melts. Hence, both the rate at which the ice melts, as well as the amount of cooling which can occur in the heat exchange fluid, are affected. Further, the space between the pipe and the ice increases as the ice melts. Thus, both the ability for the ice to melt and the ability for the heat exchange fluid to be cooled decreases. Therefore, the performance of the TES system has the tendency to become more inefficient as the ice melts. That is, the performance of the internal melt cycle decreases during the course of the cycle.

Another melt cycle which is often used to melt a thermal energy storage medium is an external melt cycle. An external melt cycle involves circulating a fluid, which is to be used as part of a cooling system, such that the fluid comes into direct contact with the thermal energy storage medium, which is typically ice. The fluid, which is cooled as the ice melts, as well as run-off from the melted ice, is used as the cooling medium within a cooling system. For an external melt cycle, although the cooling fluid used to melt the ice may be any of a number of different substances, the cooling fluid is typically water.

As the cooling fluid is in direct contact with the ice during an external melt cycle, the fluid is generally at a temperature which is close to the temperature of the ice. As such, the thermal performance of a TES system which uses an external melt cycle is generally better than the performance which is typically achieved with a TES system which uses the internal melt cycle described above. However, in order to use an external melt system, a tank that is used to house the ice must be sized to accommodate the flow of fluid over the ice. As such, less ice may be formed in a tank of a given size.

Further, uniform ice melt is often difficult to achieve in an external melt system. In order to uniformly melt the ice such that consistency and, therefore, efficiency in the thermal performance of the TES system is maintained, high flow rates for the fluid are often required. In addition, a variety of controls and sensors are typically used to detect undesirable ice build-up, e.g., bridging, which often occurs when ice is not uniformly melted. Such controls and sensors are both expensive and difficult to maintain. However, without the controls and sensors, bridging in the ice often causes ice to be non-uniformly and, therefore, inefficiently melted.

The utility of TES systems is often limited by the performance of the TES systems, as well as by the cost of such systems, and the complexity of controls and sensors that are needed to maintain such systems. As the importance of the efficient use of energy increases, the potential use of TES systems also increases. Hence, the ability to provide efficient, relatively inexpensive, and easy to maintain TES systems is desirable. Therefore, what is desired are methods and apparatus for efficiently providing cooled fluid to a cooling system that is a part of an overall TES system.

SUMMARY OF THE INVENTION

The present invention relates, in one aspect, to a heat exchange system which uses both an internal melt cycle and an external melt cycle to extract stored thermal energy. The heat exchange system includes a thermal energy storage medium and a heat exchanger which is in communication with the thermal energy storage medium. The heat exchanger is arranged to hold a heat exchange liquid and to facilitate the indirect transfer of heat between the heat exchange liquid and the thermal energy storage medium. The heat exchange system further includes a fluid supply which provides a cooling fluid which directly contacts the thermal energy storage medium to transfer heat between the cooling fluid and the thermal energy storage medium.

In one embodiment, the heat exchanger includes a plurality of heat exchange tubes that are arranged to allow the heat exchange liquid to flow therethrough. In another embodiment, the heat exchange system is in communication with a cooling system that uses the heat exchange liquid to generate chilled air. In such an embodiment, the cooling system may also be arranged to use the cooling fluid in the generation of chilled air.

According to another aspect of the present invention, a method for extracting thermal energy stored as a substantially frozen substance involves at least partially melting the frozen substance using a first melting process. The first melting process is arranged to cause a channel to be formed in the frozen substance. The method further involves at least partially melting the frozen substance using a second melting process that is facilitated by the channel formed in the frozen substance. In one embodiment, the substantially frozen substance is frozen around at least a portion of a heat exchanger, and the channel is formed around the portion of the heat exchanger. In such an embodiment, a first substance is circulated through the portion of the heat exchanger, such that the first substance is cooled as the channel is formed. Further, in such an embodiment, a second substance is run over the frozen substance such that the second substance is substantially in contact with the frozen substance. The second substance is also run through the channel, and is cooled by contact with the frozen substance.

According to still another aspect of the present invention, a thermal energy storage system includes a holding tank which is arranged to hold a thermal energy storage medium and has an inlet and an outlet. Within the holding tank, a heat exchanger, which is arranged to indirectly transfer heat between a heat exchange fluid that passes through the heat exchanger and the thermal energy storage medium, is positioned. The holding tank is coupled to a chiller that is arranged to cool the heat exchange fluid, and a cooler which is arranged to generate chilled air using a cooling fluid. The thermal energy storage system also includes a first heat exchanger supply loop for delivering cooled heat exchange fluid from the chiller to the heat exchanger and for returning the heat exchange fluid from the heat exchanger to the chiller after the heat exchange fluid passes through the heat exchanger. A holding tank supply loop within the thermal energy storage system is arranged to deliver cooling fluid from the cooler to the holding tank such that when the thermal energy storage medium is present, the delivered cooling fluid directly contacts the thermal energy storage medium. The holding tank supply loop is further arranged to return the cooling fluid from the holding tank to the cooler. A second heat exchanger supply loop is arranged to deliver warmed heat exchange fluid to the heat exchanger.

The thermal energy storage system is further arranged to cause the thermal energy storage medium to cycle between solid and liquid phases to facilitate the storage of energy. When the thermal energy storage medium is in a solid phase, the heat exchange fluid delivered through the second heat exchanger supply loop may be used to form channels in the thermal energy storage medium via an internal melt process to facilitate more even melting of the thermal energy storage medium during an external melt process utilizing cooling fluid delivered through the holding tank supply loop.

These and other advantages of the present invention will become apparent upon reading the following detailed description and studying the various figures of the drawings.

BRIEF DESCRIPTION OF THE DRAWINGS

The invention may best be understood by reference to the following description taken in conjunction with the accompanying drawings in which:

FIG. 2c is a diagrammatic representation of a third configuration of a heat exchanger in accordance with an embodiment of the present invention.

DETAILED DESCRIPTION OF THE EMBODIMENTS

Conventional Thermal Energy Storage (TES) systems are often either, or both, inefficient and expensive. In particular, internal melt cycles, which are used to melt a thermal storage medium are inconsistent with regards to efficiently producing cooled substances which may be used as a part of a cooling system. On the other hand, from a performance standpoint, external melt cycles that are used to melt a thermal storage medium are more consistent than internal melt cycles. However, the implementation of external melt cycles is generally expensive and, hence, often considered to be inefficient as well.

The present invention seeks to combine desirable qualities of internal melt and external melt cycles to provide a TES system with good performance at a reasonable cost. In the described TES system, a thermal storage medium is cooled, e.g., frozen, and an internal melt cycle is used to form flow channels in the thermal storage medium. While flow channels are being formed using the internal melt process, heat exchange fluids used in the internal melt process are cooled. Once flow channels are formed, an external melt cycle is implemented, either alone or in conjunction with the internal melt cycle, to further provide cooled fluid for use with a cooling system. Fluid flow during the external melt cycle is primarily through the flow channels produced during the internal melt cycle. The flow channels are typically substantially uniform, and have a relatively large surface area, which generally enables cooling to be maximized. Since the surface area of the flow channels is relatively large, the flow rate of the cooling fluid used in the external melt process to melt the thermal energy storage medium may be kept relatively low.

Figure 1A:
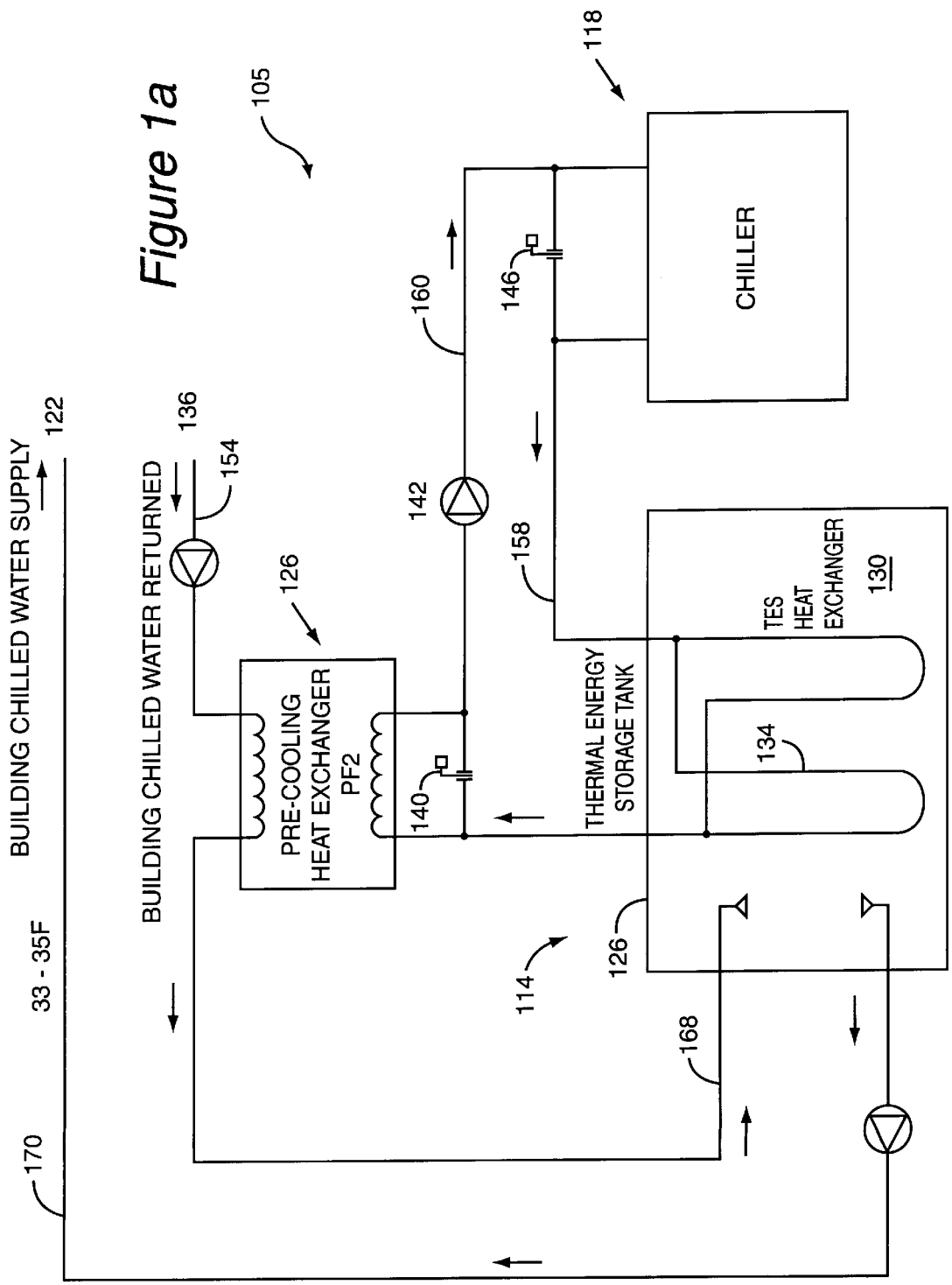
FIG. 1a is a diagrammatic block representation of an open-loop thermal energy storage (TES) system in accordance with an embodiment of the present invention.

Referring initially to FIG. 1a, a TES system will be described in accordance with an embodiment of the present invention. A TES system 105 typically includes an energy storage unit 114, a chilling unit 118, a cooler unit 122, and a water supply 136. Energy storage unit 114 includes an enclosure 126 which holds a thermal energy storage medium 130. Energy storage unit 114 also includes a heat exchanger 134 which is in contact with thermal energy storage medium 130, and a pre-cooling heat exchanger 126. Although heat exchanger 134 may take on a variety of different forms, three particularly suitable configurations of heat exchanger 134 will be described below with respect to FIGS. 2a–2c.

When energy rates are relatively low, e.g., during off-peak energy demand periods, thermal energy storage medium 130 is cooled by pumping a heat exchange liquid through chiller 118. Chiller 118 is a part of an overall source of heat exchange liquid. From chiller 118, the heat exchange liquid is pumped through a line 158 heat exchanger 134. It should be appreciated that suitable heat exchange liquids may be widely varied and include, by way of example, propylene glycol and ethylene glycol.

The heat exchange liquid may be returned from heat exchanger 134 to chiller 118 through a line 160, bypass valve 140, and pump 142, without passing through pre-cooling heat exchanger 126. By cooling thermal energy storage medium 130, energy is stored in thermal energy storage medium 130. It should be appreciated that although thermal energy storage medium 130 may be any substance which is capable of maintaining a chilled temperature, in one embodiment, thermal energy storage medium 130 is a substance which undergoes a phase change when the substance is chilled. By way of example, one particularly suitable substance is water. Water undergoes a phase change from liquid form to ice when substantially chilled, i.e., when frozen at approximately zero degrees Centigrade or less.

During times when energy rates are higher, e.g., during peak energy demand periods, and chilled water is desired, stored energy may be extracted from thermal energy storage unit 114. When energy is to be extracted from thermal energy storage unit 114, stored energy is extracted using a combination of an internal melt process and an external melt process. An internal melt cycle, or process, involves enabling thermal energy storage medium 130 to exchange heat with a heat exchange liquid without direct contact being made between thermal energy storage medium 130 and the heat exchange liquid. By way of example, the heat exchange liquid, which is generally the same heat exchange liquid that is used to cool thermal energy storage medium, is pumped through line 158 to heat exchanger 134, bypassing chiller 118 through valve 146. Pumping the heat exchange liquid through heat exchanger 134 cools, or chills, the heat exchange liquid and enables portions of thermal energy storage medium 130 to be melted. Once the heat exchange liquid is chilled, the chilled heat exchange liquid is then pumped through a pre-cooling heat exchanger 140, to provide chilled water for use, for example, in air-conditioning a building. It should be appreciated that the melted portions of thermal energy storage medium 130 may also be pumped through a heat exchanger.

In general, the use of the building chilled water supply to generate chilled air results in the heating of heat exchange liquid. The heated heat exchange liquid may be circulated back through a line 154 to pre-cooling heat exchanger 126. In some embodiments, the heated heat exchange liquid may be cooled by chiller 118 and heat exchanger 134. In other embodiments, the heated heat exchange liquid may be cooled by substantially only heat exchanger 134.

An external melt cycle, or process, involves cooling a heat exchange fluid, or any other fluid, e.g., water, by allowing the fluid to directly contact thermal energy storage medium 130. Direct contact between the fluid and thermal energy storage medium 130 facilitates the exchange of heat between the fluid and thermal energy storage medium 130. Such a fluid may be provided from water supply 136 which is positioned to allow fluid to flow over thermal energy storage medium 130. As the fluid flows through a line 168, then over and around thermal energy storage medium 130, thermal energy storage medium 130 typically melts, or otherwise "warms up". Due to the fact that the fluid is in direct contact with thermal energy storage medium 130, the temperature of the fluid, once the fluid is cooled by the thermal energy storage medium 130, is generally only a few degrees above the freezing, or chilled, temperature of thermal energy storage medium 130.

Once fluid provided by water supply 136 is allowed to flow over and around thermal energy storage medium 130 to at least partially melt thermal energy storage medium 130, the fluid, as well as melted portions of thermal energy storage medium 126, may be extracted from within pre-cooling heat exchanger, or enclosure, 126 through a line 170. Once extracted, or drained out of enclosure 126, the fluid and melted portions of thermal energy storage medium 126 may be provided to cooler 122 through line 170 for use in the generation of chilled, or cooled, air.

By increasing the surface area of thermal energy storage medium 130 which comes into direct contact with fluid during an external melt process, the thermal performance of thermal energy storage unit 114 is typically improved, as more of thermal energy storage medium 130 may be melted. Further, the uniformity with which thermal energy storage medium 130 is melted is also improved by increasing the surface area of thermal energy storage medium 130 which comes into contact with fluid, as will be appreciated by those skilled in the art.

To increase the surface area of thermal energy storage medium 130, or, more particularly, to increase the surface area with respect to the overall volume of thermal energy storage medium 130, both an internal melt cycle and an external melt cycle may be implemented. By way of example, an internal melt cycle may be used to create flow channels which may be used during an external melt cycle. Specifically, the creation of flow channels using an internal melt cycle provides additional surface area on thermal energy storage medium 130 which may be contacted by fluid provided during an external melt cycle, as will be described below with respect to FIGS. 3a–3c.

Figure 1B:
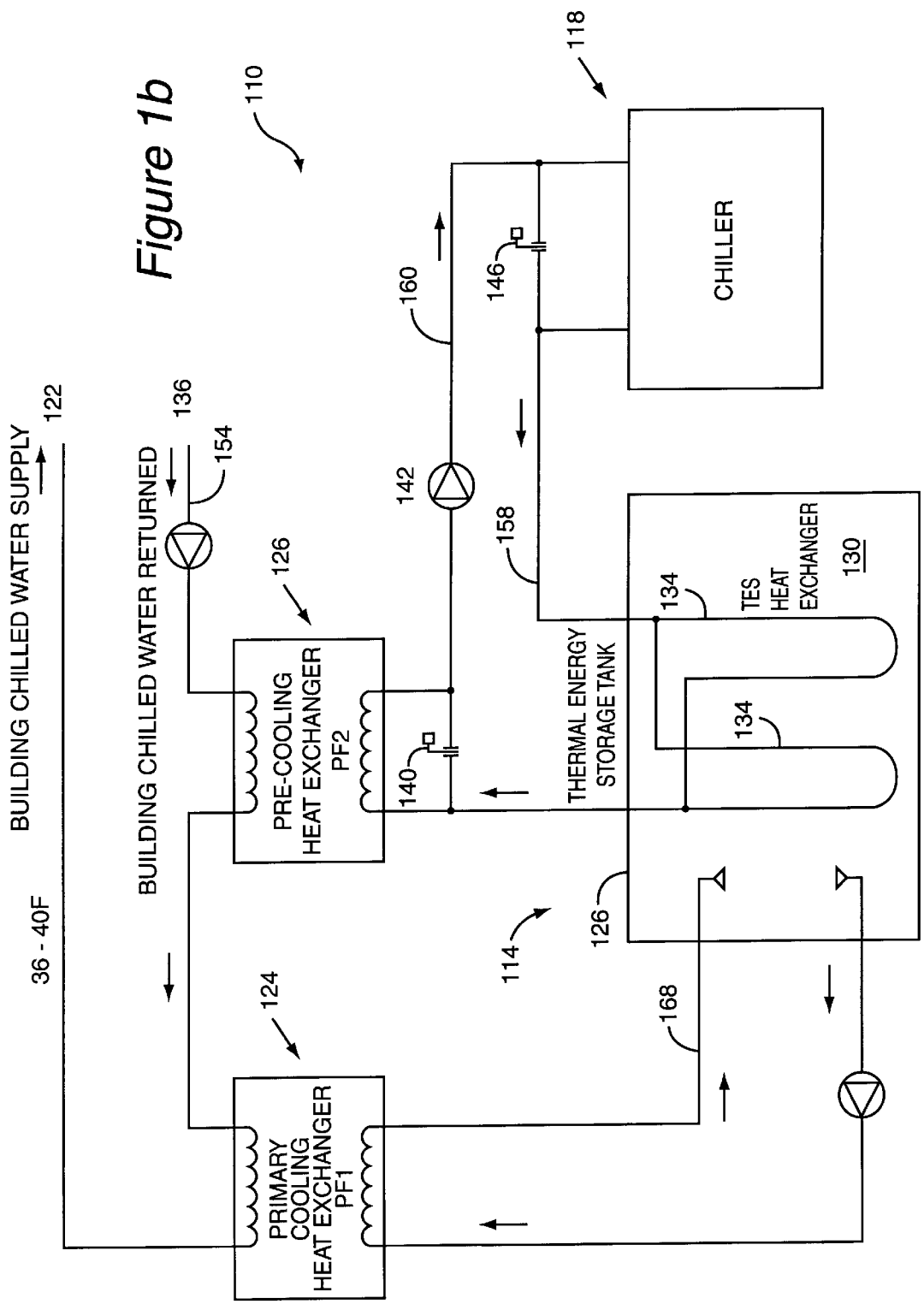
FIG. 1b is a diagrammatic block representation of a closed-loop thermal energy storage (TES) system in accordance with an embodiment of the present invention.

As mentioned above, FIG. 1a shows an open-loop TES system. As will be appreciated by those skilled in the art, a TES system may also be closed-loop. FIG. 1b is a diagrammatic block representation of a closed-loop TES system in accordance with an embodiment of the present invention. A closed-loop TES system 110 is similar to open-loop TES system 105 of FIG. 1a. One difference between TES system 110 and TES system 105 of FIG. 1a is that TES system 110 uses a primary cooling heat exchanger 124 to cool the chilled water return from the external melt. Specifically, in the embodiment as shown, TES system 105 utilizes a primary cooling heat exchanger 124 in addition to pre-cooling heat exchanger 126.

Figure 2A:
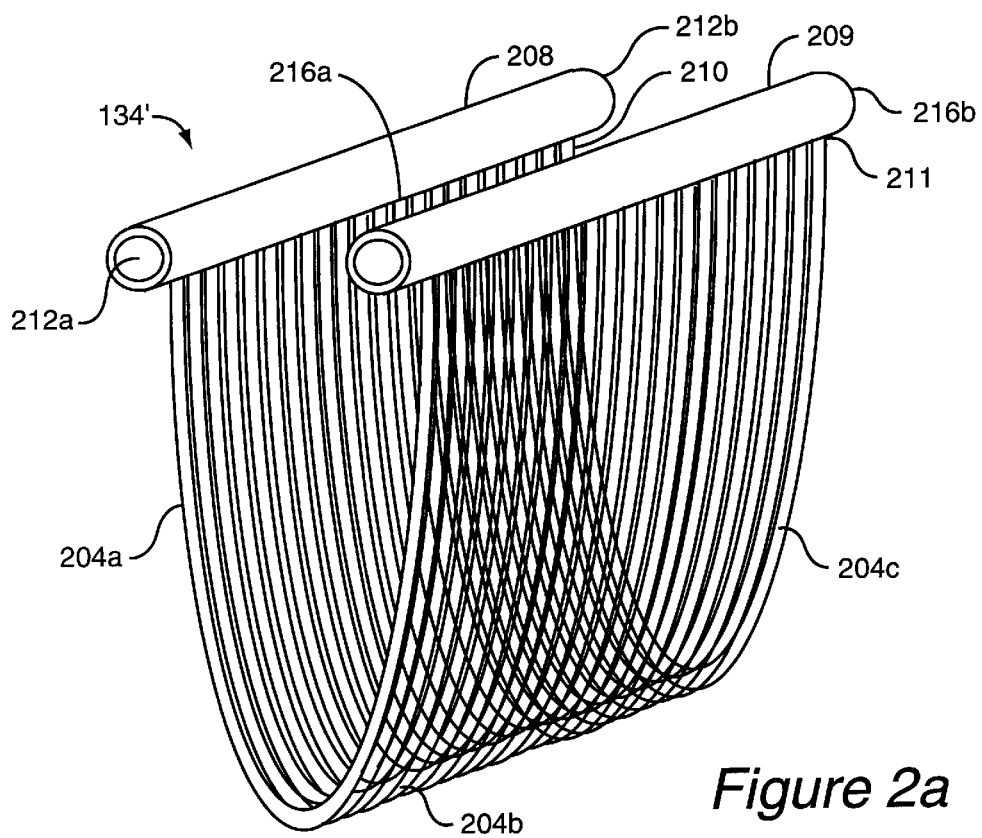
FIG. 2a is a diagrammatic representation of a first configuration of a heat exchanger in accordance with an embodiment of the present invention.

Heat exchanger 134, as previously mentioned, may take any suitable form. With reference to FIG. 2a, one embodiment of a heat exchanger for use in a TES system with a combined internal and external melt process will be described. That is, one embodiment of heat exchanger 134 of FIG. 1 will be described. Heat exchanger 134' is considered to be a "bent" heat exchanger, as heat exchange tubes 204 of heat exchanger 134' are formed into a substantially U-shaped configuration. Heat exchange tubes 204 may be made from any suitable material. By way of example, heat exchange tubes 204 may be made from thermoplastic materials which include, but are not limited to, polyolefins such as polypropylene and polyethylene. In one embodiment, heat exchange tubes 204 may be made from a dark, thermoplastic material.

The dimensions of heat exchange tubes 204, as well as the number of heat exchange tubes 204 included in heat exchanger 134', may be widely varied depending upon the requirements of a particular TES application. In the described embodiment, the outer diameter of heat exchange tubes 204 is in the range of approximately 0.2 to approximately 0.5 inches, as for example approximately 0.25 inches, while the inner diameter for heat exchange tubes 204 may vary from approximately 0.15 inches to approximately 0.45 inches, as for example approximately 0.2 inches. The length of heat exchange tubes 204 may range from approximately 80 inches in length to approximately 220 inches in length.

Heat exchange tubes 204 are arranged in an array such that tubes 204 are substantially parallel and adjacent to one another. In general, heat exchange tubes 204 are held such that contact between adjacent tubes 204 is minimal. In order to maintain minimal contact between adjacent heat exchange tubes 204, spacers (not shown) may be included as part of heat exchanger 134' for the purpose of holding heat exchange tubes 204 substantially apart. When heat exchange tubes 204 are held substantially apart, a thermal energy storage medium may be frozen around tubes 204. Heat exchange tubes 204 are attached to header pipes 208, 209. Specifically, opposite ends of heat exchange tubes 204 are coupled to different header pipes 208, 209, e.g., a first end 210 and a second end 211 of heat exchange tube 204c are coupled to header pipe 208 and header pipe 209, respectively. Header pipe 208 is arranged to be coupled to a supply of heat exchange fluid, such that a heat exchange fluid may flow through header pipe 208 and into heat exchange tubes 204. The heat exchange fluid then flows through heat exchange tubes 204, to header pipe 209, which is generally coupled to a cooling system, e.g., cooler 122 of FIG. 1.

In general, header pipe 208 is open at a first end 212a to enable a heat exchange fluid to flow therethrough. However, in order to essentially "force" the heat exchange fluid to flow through heat exchange tubes 204, in one embodiment, a second end 212b of header pipe 208 is usually capped. Similarly, a first end 216a of header pipe 209 is open to enable heat exchange fluid to flow through header pipe 209 to an cooling system, whereas a second end 216b of header pipe 209 is capped to constrain the heat exchange fluid to flow towards first end 216a.

Heat exchanger 134' may be arranged such that only portions of heat exchange tubes 204 are submerged in a thermal energy storage medium, as will be discussed below with reference to FIG. 3a. In other words, a thermal energy storage medium may be frozen around only portions of heat exchange tubes 204. Alternatively, heat exchanger 134' may be arranged such that heat exchanger 134' is substantially submerged in a thermal energy storage medium such that a thermal energy storage medium may be frozen around most, if not all, of heat exchange tubes 204, as will be described below with respect to FIG. 4a.

As heat exchanger 134' may be arranged such that neither header pipe 208 nor header pipe 209 is necessarily submerged in a thermal energy storage medium, issues related to "plumbing," or the arrangement of pipes used to transport flow of heat exchange liquid to and from header pipes 208, 209, may be avoided. That is, access to header pipes 208, 209 may be maintained substantially above the surface of a thermal energy storage medium in which heat exchanger 134' is located, thereby facilitating access to header pipes 208, 209.

Figure 2B:
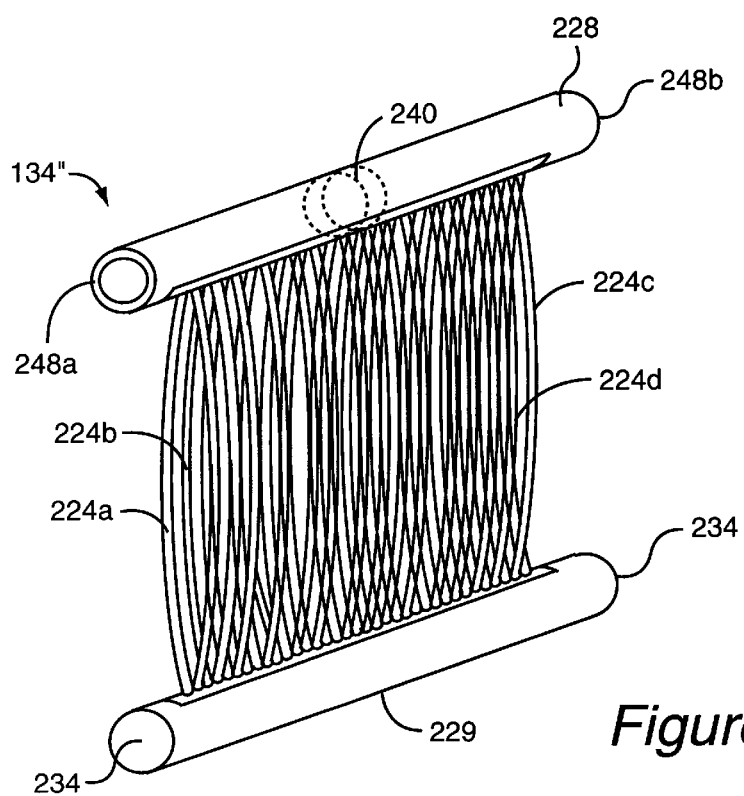
FIG. 2b is a diagrammatic representation of a second configuration of a heat exchanger in accordance with an embodiment of the present invention.

FIG. 2b is a diagrammatic representation of a second configuration of a heat exchanger in accordance with an embodiment of the present invention. A "straight" or panel-like heat exchanger 134", like heat exchanger 134' described above with respect to FIG. 2a, is composed of an array of heat exchange tubes 224 that are coupled to header pipes 228, 229. Heat exchange tubes 224 are arranged such that individual heat exchange tubes 224, e.g., heat exchange tubes 224a and 224b, are substantially adjacent to and parallel with one another. Spacers (not shown) may be used to maintain space between adjacent heat exchange tubes 224 such that portions of a thermal energy storage medium may be frozen substantially around each heat exchange tube 224. Heat exchange tubes 224, in the described embodiment, are formed from a thermoplastic material, as for example polypropylene and polyethylene. A heat exchange fluid may flow from header pipe 228, which is generally arranged to be coupled to a supply of heat exchange fluid, through heat exchange tubes 204. As the heat exchange fluid flows, an internal melt process enables heat transfer to occur "indirectly" between the heat exchange liquid and the thermal energy storage medium that is frozen around heat exchange tubes 224. That is, heat exchange occurs through heat exchange tubes 204.

Heat exchanger 134" is arranged such that when heat exchanger 134" is at least partially submerged in a thermal energy storage medium, header pipe 229 is submerged in the thermal energy storage medium. As such, due to the fact that access, e.g., plumbing access, to header pipe 229 is preferably substantially above or near the surface of the thermal energy storage medium, heat exchanger 134" may be configured such that plumbing access to header pipe 229 is generally unnecessary.

In the described embodiment, the ends 234 of header pipe 229 are capped, and the flow of heat exchange fluid is channeled "down" some heat exchange tubes 224, e.g., heat exchange tubes 224a and 224b, through header pipe 229, and back "up" through other heat exchange tubes 224, e.g., heat exchange tubes 224c and 224d. That is, a loop for the flow of a heat exchange liquid is formed in heat exchanger 134". Such a loop enables access, e.g., plumbing access, to heat exchanger 134" to be substantially limited to header pipe 228. In order to form a loop for the flow of a heat exchange liquid, a block 240 may be placed within header pipe 240 to prevent the heat exchange fluid from flowing directly from a first end 248a to a second end 248b of header pipe 228, which are both open in the described embodiment. That is, as first end 248a and second end 248b are open, block 240 may be used to form a barrier within header pipe 228 to facilitate the flow of heat exchange fluid through heat exchange tubes 224, as will be appreciated by those skilled in the art.

With reference to FIG. 2c, a third configuration of a heat exchanger will be described in accordance with an embodiment of the present invention. A heat exchanger 134'" may be considered to be a coupled panel heat exchanger, as heat exchanger 134'" is essentially composed of two panel heat exchangers, which are similar to heat exchanger 134" of FIG. 2b. Heat exchanger 134'" includes a first panel 260 and a second panel 262. A first header pipe 268 of panel 260 is open at a first end 272a and capped at a second end 272b, such that the flow of heat exchange fluid through heat exchange tubes 274 is facilitated. That is, heat exchange fluid, which flows into first end 272a and through first header pipe 268, is further essentially forced to flow through heat exchange tubes 274.

A second header pipe 269 of first panel 260 is capped at a first end 276a, and is open at a second end 276b. An extension pipe 278 is coupled to second end 276b of second header pipe 269 of first panel 260, as well as to an open first end 280a of a second header pipe 289 of second panel 262. A second end 280b of second header pipe 289 of second panel 262 is capped. As such, any heat exchange fluid which flows through second header pipe 269 of first panel 260 then flows through extension pipe 278 and second header pipe 289 of second panel 262. The heat exchange fluid then flows up through heat exchange tubes 294 of second panel, and into a first header pipe 288 of second panel 262. A first end 296a of first header pipe 288 of second panel 262 is capped, while a second end 296b of first header pipe 288 of second panel 262 is open. Hence, heat exchange fluid may exit heat exchanger 134''' through second end 296b of first header pipe 288 of second panel 262.

In general, when heat exchanger 134''' is in use, header pipes 269 and 289 are submerged beneath the surface of a thermal energy storage medium. As such, as previously described, plumbing access to header pipes 269 and 289, although possible, is less desirable than plumbing access to header pipes 268 and 288, which are generally either above or near the surface of the thermal energy storage medium. By enabling heat exchange fluid to enter heat exchanger 134''' from first header pipe 268 of first panel 260 and exit heat exchanger 134''' through first header pipe 288 of second panel 262, plumbing access to heat exchanger 134''' is generally maintained substantially above the surface of the thermal energy storage medium.

In order to promote a transfer of heat between a heat exchanger or, more specifically, a heat exchange fluid which runs through the heat exchanger, and a thermal energy storage medium, the heat exchanger is typically placed in contact with the thermal energy storage medium. Referring next to FIG. 3a, one orientation of a heat exchanger with respect to a thermal energy storage medium will be described. In particular, one orientation of heat exchanger 134' of FIG. 2a will be described. FIG. 3a is a diagrammatic cross-sectional representation of a thermal energy storage unit prior to a melt cycle in accordance with an embodiment of the present invention. Thermal energy storage unit 114' includes a holding tank 303 which, as shown, has an insulating layer 304 which is arranged to insulate a thermal energy storage medium 130', e.g., water, contained within holding tank 303. It should be appreciated that although holding tank 303 may be used to enclose thermal energy storage medium 130' without the benefit of insulating layer 304, the inclusion of insulating layer 304 increases the overall efficiency of thermal energy storage unit 114'. Although insulating layer 304 may be made from any suitable material, in one embodiment, insulating layer 304 is made from foam insulation.

As shown, heat exchanger 134' is oriented such that header pipes 208 and 209 are above a top surface 316 of thermal energy storage medium 130' to facilitate access to header pipes 208 and 209 from, for example, a source of heat exchange fluid (not shown). As shown, thermal energy storage medium 130' is frozen around heat exchange tube 204 or, more specifically, the portions of heat exchange tube 204 that are submerged in thermal energy storage medium 130'. When thermal energy storage medium 130' is frozen, thermal energy is stored in thermal energy storage medium 130'.

Although thermal energy storage medium 130' may be chilled or frozen using any suitable process, in the described embodiment, a heat exchange fluid is circulated through heat exchanger 134' to freeze thermal energy storage medium 130'. The heat exchange fluid will generally be at a temperature that is low enough such that heat transfer from the heat exchange fluid through heat exchange tubes 204 to thermal energy storage medium 130' is enough to promote cooling and, eventually, freezing of thermal energy storage medium 130'. By way of example, if thermal energy storage medium 130' is water, as water freezes at a temperature of approximately zero degrees Centigrade, a heat exchange fluid at a temperature that is lower than approximately zero degrees Centigrade will typically promote the freezing of the water.

In one embodiment, thermal energy storage medium 130' may be completely frozen within holding tank 303. However, it should be appreciated that in other embodiments, some portions of thermal energy storage medium 130' may be frozen while other portions remain substantially liquid. Specifically, portions of thermal energy storage medium 130' which are closest to heat exchanger 134' may be frozen, while outlying portions of thermal energy storage medium 130', or portions of thermal energy storage medium 130' that are further from heat exchanger 134', may remain substantially liquid. In general, as will be appreciated by those skilled in the art, by varying the duration of a thermal energy storage process, e.g., a freezing process, the size of the frozen portions of thermal energy storage medium 130' may be controlled.

Figure 3A:
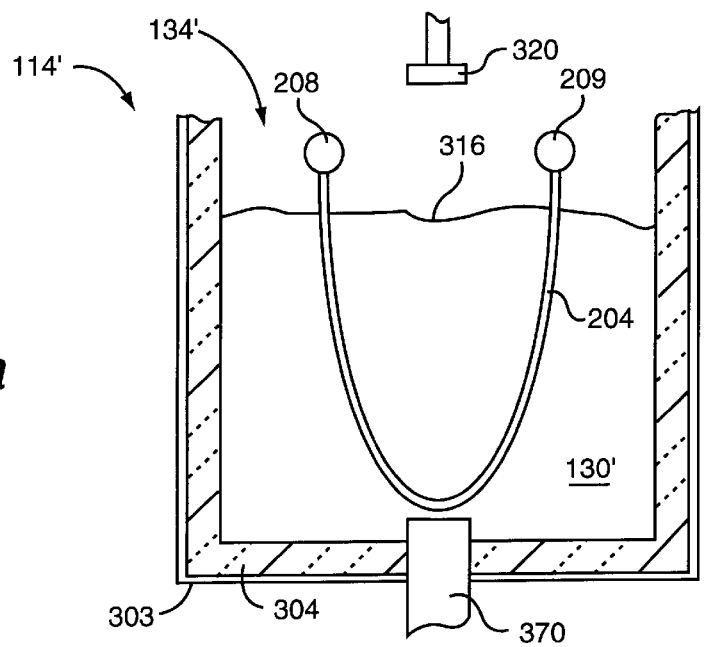
FIG. 3a is a diagrammatic cross-sectional side view of a first thermal energy storage unit prior to a melt cycle in accordance with an embodiment of the present invention.
Figure 3B:
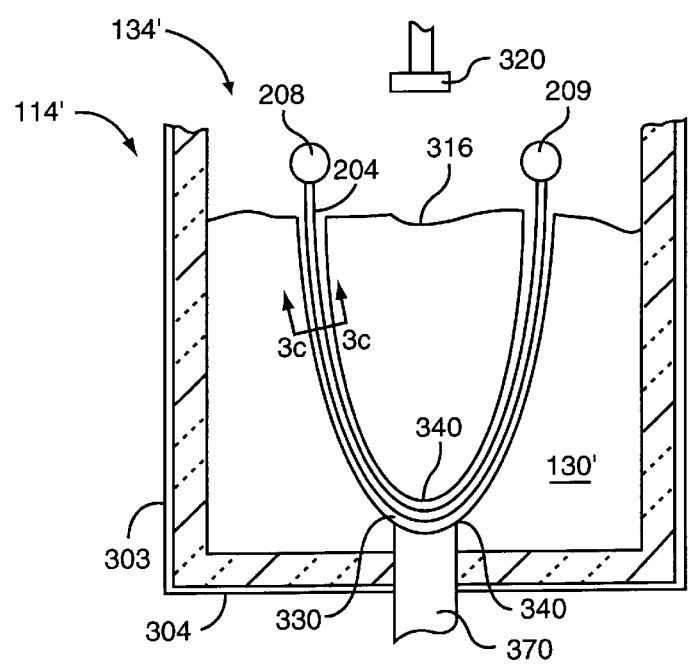
FIG. 3b is a diagrammatic cross-sectional side view of the first thermal energy storage unit of FIG. 3a after an initial internal melt process in accordance with an embodiment of the present invention.

FIG. 3b is a diagrammatic cross-sectional side view of thermal energy storage unit 114' of FIG. 3a after an initial internal melt process in accordance with an embodiment of the present invention. An internal melt process is used to melt a flow channel 330 in thermal energy storage medium 130' around substantially each heat exchange tube 204 in heat exchanger 134'. In the described embodiment, the internal melt process involves circulating a heat exchange fluid through heat exchanger 134'. Heat transfer between thermal energy storage medium 130' and the heat exchange fluid that is circulating through heat exchanger 134' or, more specifically, heat exchange tube 204, causes channel 330 to be formed around heat exchange tube 204, as will be described below with respect to FIG. 3c. It should be appreciated that during the internal melt process, the heat exchange fluid is cooled while at least portions of thermal energy storage medium 130', particularly portions which are in close proximity with heat exchange tube 204, are melted. The chilled heat exchange fluid is generally used as part of a cooling system that generates chilled air.

The melted portions of thermal energy storage medium 130' may be drained from thermal energy storage unit 114' using a draining mechanism 370 situated within thermal energy storage unit 114'. It should be appreciated that the draining mechanisms are typically coupled to the cooling system such that the melted portions of thermal energy storage medium 130' may also be used as part of the cooling system to generate chilled air. In one embodiment, draining mechanisms may be arranged to drain the melted portions of thermal energy storage medium 130' from near top surface 316 of thermal energy storage medium 130'. In another embodiment, as shown, draining mechanism 370 may be located such that draining mechanism 370 is in communication with channel 330 and is arranged to drain melted portions of thermal energy storage medium 130' from channel 330.

It should be appreciated that for embodiments in which only portions of thermal energy storage medium 130' are initially frozen prior to an internal melt process, when channel 330 is created during an internal melt process, channel 330 may be in communication with unfrozen, i.e., liquid, portions of thermal energy storage medium 130'. By way of example, the bottom of channel 330 may open into an unfrozen portion of thermal energy storage medium 130'. In such embodiments, draining mechanisms may be added near the interior bottom of holding tank 303 to drain melted portions of thermal energy storage medium 130'.

Once channel 330, or a "melt-zone", is formed using an internal melt process, an external melt process is typically implemented to continue the melting of thermal energy storage medium 130'. That is, after an internal melt process is used to establish a flow path, or paths, in thermal energy storage medium 130', an external melt process is used to melt substantially the remainder of thermal energy storage medium 130'. The external melt process may be implemented at any time after channel 330 is formed. However, the external melt process is typically not implemented until channel 330 has an axial dimension that is large enough to accommodate the flow of water therethrough, around heat exchange tube 204. In one embodiment, the external melt process begins when the axial dimension of channel 330 is approximately twice the size of the outer diameter of heat exchange tube 204. Although the diameter of heat exchange tube 204 may be widely varied, in the described embodiment, the outer diameter of heat exchange tube 204 is in the range of approximately 0.2 to approximately 0.5 inches, as for example approximately 0.25 inches, as previously mentioned. Accordingly, the axial dimension, e.g., diameter, of channel 330 may be in the range of approximately 0.4 inches to approximately 1 inch, although it should be understood that the actual axial dimension of channel 330 may be widely varied.

During an external melt process, fluid, e.g., water, may be flowed over thermal energy storage medium 130' from a water source 320 to melt thermal energy storage medium 130'. Water source 320 may generally be arranged in any suitable manner. In one embodiment, water source 320 may be a pipe arranged to flow water over thermal energy storage medium 130'. In another embodiment, water source 320 may be a sprinkler arrangement arranged to substantially evenly distribute water over thermal energy storage medium 130'.

Water is flowed over thermal energy storage medium 130' such that water flows through channel 330. By enabling water to flow through channel 330, thermal energy storage medium 130' may be melted substantially uniformly, when the water in the channel comes into contact with channel surfaces 340, as will be described below with respect to FIG. 3c. Further, the existence of channel 330 formed around heat exchange tube 204 in thermal energy storage medium 130' generally prevents bridging, or obstruction of water flow paths, from occurring.

As thermal energy storage medium 130' melts, the run-off from the external melt process, i.e., the melted portions of thermal energy storage medium 130' as well as the water used in the external melt process, is drained or circulated from thermal energy storage unit 114' using a draining mechanism, e.g., draining mechanism 370, that is coupled to a cooling system which uses the run-off to generate chilled air. It should be appreciated that the draining mechanism may be located in any suitable portion of holding tank 303, as previously described. Further, the draining mechanism may take on any number of different forms. By way of example, the draining mechanism may include a pipe which draws the run-off from a localized area of holding tank 303, such as one side of holding tank 303. Alternatively, the draining mechanism may be arranged to draw the run-off over different areas of holding tank 303. For example, the draining mechanism may be arranged to draw the run-off from locations near the bottom of holding tank 303 and locations near top surface 316 of thermal energy storage medium 316.

In one embodiment, the internal melt process is allowed to continue even after the external melt process has been implemented. By enabling the internal melt process to continue, the cooling system linked to thermal energy storage unit 114' is provided with cooled heat exchange fluid in addition to run-off, and may, therefore, produce a larger amount of chilled water than would be produced if only the run-off were used in the production of chilled air. In another embodiment, the internal melt process is stopped once the external melt process is implemented. The efficiency of the heat transfer between a heat exchange fluid circulating through heat exchanger 134' and thermal energy storage medium 130' typically decreases as thermal energy storage medium 130' melts, due to the fact that as thermal energy storage medium 130' melts, the axial dimension of channel 330 increases. As such, in some systems, the use of an external melt process alone, after an initial internal melt process, may be preferred over the use of both processes simultaneously, after an initial internal melt process.

Figure 3C:
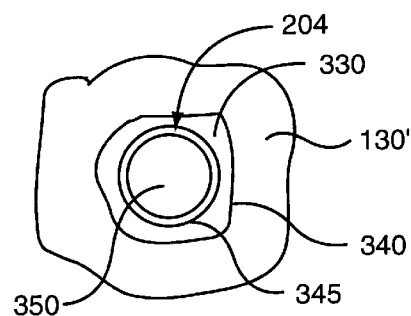
FIG. 3c is a diagrammatic cross-sectional view of the area around a heat exchange tube after an internal melt process taken along line 3c–3c of FIG. 3b in accordance with an embodiment of the present invention.

FIG. 3c is a diagrammatic cross-sectional view of the area around a heat exchange tube after an internal melt process in accordance with an embodiment of the present invention. That is, FIG. 3c is a cross-sectional view of heat exchange tube 204, channel 330, and a portion of thermal exchange medium 130' taken along line 3c–3c of FIG. 3b. During an internal melt process, a heat exchange fluid, as for example glycol, flows through interior 350 of heat exchange tube 204. The thermal conductivity of heat exchange tube 204 enables heat to be transferred through wall 345 of heat exchange tube 204. During an internal melt process, portions of thermal energy storage medium 130' which are either in contact with or in close proximity to heat exchange tube 204, are melted. Eventually, channel 330, which is defined by channel surface 340 of thermal energy storage medium 130', is formed.

The formation of channel 330 is due to the heat transfer through wall 345 of heat exchange tube 204. The heat exchange fluid which flows through interior 350 of heat exchange tube 204 transfers heat through wall 345. This heat melts a portion of thermal energy storage medium 130' and, as thermal energy storage medium 130' melts, channel 330 is formed. "Cold" is transferred from thermal energy storage medium 130' through wall 345 to the heat exchange fluid as the heat exchange fluid flows through interior 350 of heat exchange tube 204. As such, the heat exchange fluid is cooled.

Channel surface 340 provides fluid used during an external melt process with additional surface contact area which, in turn, enables the fluid to be more efficiently chilled. As the ratio of fluid in contact with thermal energy storage medium 130' to the amount of fluid increases, the efficiency of the external melt process also increases.

Figure 4A:
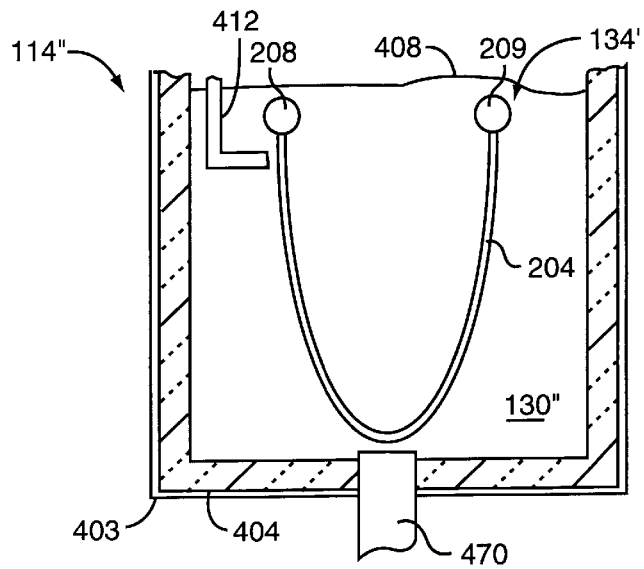
FIG. 4a is a diagrammatic cross-sectional side view of a second thermal energy storage unit prior to a melt cycle in accordance with an embodiment of the present invention.

Increasing the amount of surface area of a heat exchanger which comes into contact with a thermal energy storage medium also increases the efficiency of a TES system. The increase in efficiency is due to a proportionally larger amount of a thermal energy storage medium which may be melted using a particular heat exchanger and, further, an increase in the rate at which the thermal energy storage medium is melted. In order to maximize the amount of surface area of a heat exchanger which comes into contact with a thermal energy storage medium, substantially the entire heat exchanger may be submerged under the surface of the thermal energy storage medium. FIG. 4a is a diagrammatic cross-sectional side view of a thermal energy storage unit with a submerged heat exchanger prior to a melt cycle in accordance with an embodiment of the present invention. A thermal energy storage unit 114" includes a holding tank 403 with a layer of insulation 404 that is arranged to insulate a thermal energy storage medium 130" contained within holding tank 403. A heat exchanger, as for example heat exchanger 134' of FIG. 2a, is submerged beneath top surface 408 of thermal energy storage medium 130". That is, header pipes 208, 209, as well as heat exchange tube 204 of heat exchanger 134' are submerged beneath surface 408 of thermal energy storage medium 130". It should be appreciated that in one embodiment, header pipes 208, 209 may also rest substantially at surface 408 of thermal energy storage medium 130".

Figure 4B:
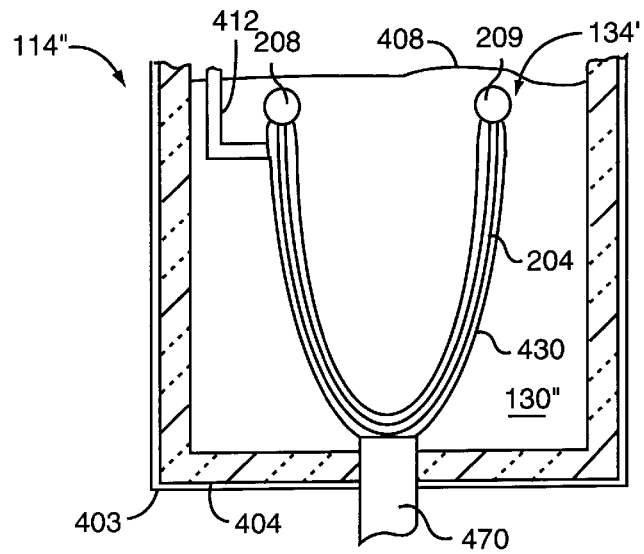
FIG. 4b is a diagrammatic cross-sectional side view of the second thermal energy storage unit of FIG. 4a after an initial internal melt process in accordance with an embodiment of the present invention.

An external flow pipe 412 is arranged to provide fluid, e.g., water, that is intended to melt thermal energy storage medium 130" after an internal melt process, as will be described with respect to FIG. 4b. FIG. 4b is a diagrammatic cross-sectional side view of thermal energy storage unit 114" of FIG. 4a after an initial internal melt process in accordance with an embodiment of the present invention. An internal melt process, as previously described, creates a flow channel 430 in thermal energy storage medium 130" around heat exchange tube 204. It should be appreciated that a draining mechanism (not shown) may be arranged to interface with channel 430 to drain or circulate melted portions of thermal energy storage medium 130" from within channel 430.

In general, thermal energy storage medium 130" may either be substantially frozen prior to an internal melt process, or only portions of thermal energy storage medium 130" may be frozen prior to an internal melt process. When only portions of thermal energy storage medium 130" are frozen prior to an internal melt process, the portions which are frozen are typically the portions which are closest to heat exchange tube 204. The amount of thermal energy storage medium 130" which is frozen is at least partially dependent upon the length of a process used to freeze thermal energy storage medium 130". Portions of thermal energy storage medium 130" which are further from heat exchange tube 204 may remain substantially liquid. When only portions of thermal energy storage medium 130" are initially frozen, when channel 430 is created during an internal melt process, it should be appreciated that channel 430 may be in communication with liquid portions of thermal energy storage medium 130".

As header pipes 208, 209, as well as all of heat exchange tube 204, are submerged beneath surface 408 of thermal energy storage medium 130", as shown, in order for an external melt process to be initiated, water is provided through external flow pipe 412 which is in contact with channel 430, as shown.

The water provided by external flow pipe 412 melts thermal energy storage medium 130" around heat exchange tube 204 and, hence, enlarges channel 430. As channel 430 enlarges, thermal energy storage medium 130" eventually melts sufficiently to provide access to channel 430 from above surface 408. That is, channel 430 is eventually exposed such that an external melt process which flows water over surface 408 is sufficient to provide flow through channel 430. It should be appreciated that the flow of water through external flow pipe 412 may be considered to be at least a part of an external melt process. In general, as portions of thermal energy storage medium 130" melt, a draining mechanism 470 may be used to extract the melted portions, as well as the water provided during an external melt process, out of holding tank 403 for use by a cooling system that is in communications with thermal energy storage unit 114".

In some embodiments, the size of channels formed in a thermal energy storage medium around heat exchange tubes may be such that during an external melt process, water has the tendency to flow substantially through only the open spaces formed between the sides of the thermal energy storage medium and a holding tank, or enclosure. The open spaces are formed as the thermal energy storage medium is melted using an external melt process. Due to pressure drops within the channels formed in the thermal energy storage medium, and the fact that water tends to flow along the path of least resistance, water used in the external melt process may have the tendency to flow mostly through the open spaces after the open spaces are formed. When water flows mostly through the open spaces and not through the channels, the thermal energy storage medium may melt in a non-uniform manner. Alternatively, sealed bags or exchangers may be used to surround heat exchanger sections, thereby preventing water flow from bypassing the flow channels.

Figure 5:
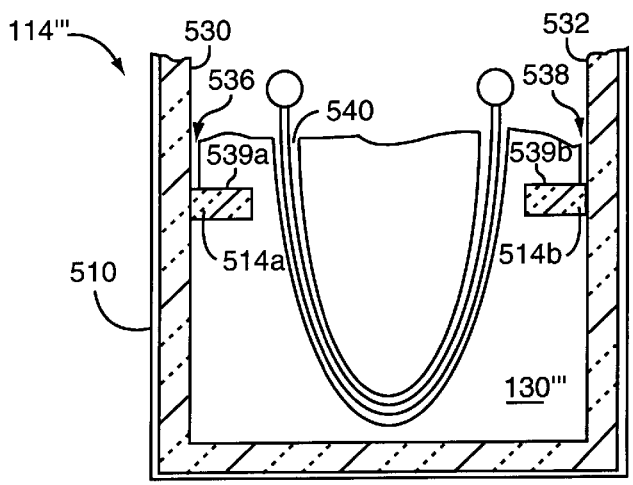
FIG. 5 is a diagrammatic cross-sectional side view of a thermal energy storage unit with baffling in accordance with another embodiment of the present invention.

To maintain a balance between the amount of water which flows in open spaces at the sides of holding tanks and the amount of water which flows in the channels formed in a thermal energy storage medium, baffles may be added to a holding tank which holds a thermal energy storage medium. FIG. 5 is a diagrammatic cross-sectional side view of a thermal energy storage unit with baffles in accordance with an embodiment of the present invention. A thermal energy storage unit 114''' is shown after the onset of an external melt process. Thermal energy storage unit 114''' includes a holding tank 510 which is lined with an insulating layer 512. Baffles 514, or baffling, which may be considered to be an extension of insulating layer 512 in one embodiment, are arranged such that as a thermal energy storage medium 130''' melts during an external melt process, baffles 514a, 514b serve as obstacles which prevent a majority of the water flow associated the external melt process from flowing down sides 530, 532, respectively. Instead, baffles 514a, 514b obstructs the overall formation of open spaces 536, 538 until a substantial amount of thermal energy storage medium 130''' has been melted. With baffles 514 in place, the flow of water in the external melt process is allowed to occur substantially through a channel 540 which was formed during an internal melt process.

While open spaces 536, 538 may expand along a top surface 539 of baffles 514 as thermal energy storage medium 130''' melts, open spaces 536, 538 may not extend past baffles 514 until top surface 539 of baffles 514 is exposed. When top surface 539 of baffles 514 is exposed, open spaces 536, 538 may then extend past baffles 514. However, it should be appreciated that baffles 514 may be sized such that once open spaces 536, 538 extend past baffles 514, channel 540 may be large enough that any pressure difference in channel 540 does not affect the overall flow of water in the external melt process.

Although only a few embodiments of the present invention have been described, it should be understood that the present invention may be embodied in many other specific forms without departing from the spirit or the scope of the invention. By way of example, although the combined cycle internal melt and external melt processes have generally been described as being an internal melt process followed by an external melt process, it should be appreciated that the internal melt and external melt processes may occur concurrently. That is, the external melt cycle may be implemented at the same time as the "initial" internal melt cycle that is used to create flow channels, while the flow channels are still being formed. Alternatively, the internal melt cycle may be allowed to continue even after suitably sized flow channels are created, to further provide cooled heat exchange liquid to a cooling system.

It should be appreciated that the water provided for an external melt process may originate from any number of different sources. By way of example, sprinklers may be provided over the surface of an thermal energy storage medium to distribute water during an external melt process. Alternatively, water may be provided through the use of pipes when higher flow rates of water are desired. The pipes may be located above the surface of a thermal energy storage medium, e.g., when flow channels are accessible from the surface, or the pipes may be located below the surface of the thermal energy storage medium, e.g., when flow channels are substantially inaccessible from the surface.

In addition, water may also be provided at the bottom of a thermal energy storage medium once flow paths, e.g., flow channels, have been created to expose and open up flow paths. By way of example, flow channels formed in a thermal energy storage medium around the heat exchange tubes of a bent heat exchanger may not be open to the bottom of a holding tank. As such, by introducing water flow at the bottom of the holding tank, the flow channels may be exposed to the bottom of the holding tank, which may facilitate an external melt process. If flow channels formed in a thermal energy storage medium are initially exposed to the bottom of a holding tank, e.g., if the portions of the thermal energy storage medium near the bottom of the holding tank are initially unfrozen, introducing water flow at the bottom of the holding tank may still further facilitate an external melt process.

Although heat exchange tubes of a heat exchanger have been described as being fabricated from a plastic material, it should be appreciated that heat exchange tubes may be created from any suitable material. By way of example, heat exchange tubes may be created from metal. Alternatively, heat exchange tubes may also be created from glass or any other material through which heat may be exchanged.

Heat exchange tubes have generally been described as being substantially vertical in orientation. It should be appreciated, however, that heat exchange tubes may be oriented in a variety of other manners. For instance, heat exchange tubes may be horizontally oriented.

Compressed air may be injected through flow channels in a thermal energy storage medium during an external melt process to introduce air bubbles into water flowing through the flow channels without departing from the spirit or the scope of the present invention. By introducing bubbles, turbulence may be generated in water flowing through the flow channels. This turbulence may produce a flow distribution which further facilitates the uniform melting of the thermal energy storage medium.

The heat exchange tubes of a heat exchanger may include angled indentations which are used to reduce the effects of any pressure drops which may occur in a heat exchange fluid as the heat exchange fluid circulates through the heat exchange tubes. Specifically, the angled indentations may be used to create turbulence and rotation in the heat exchange fluid, thereby reducing the magnitude of any pressure drops which, when present, may reduce the flow rate of the heat exchange fluid. As a reduction in the flow rate of the heat exchange fluid may affect the efficiency of freezing and melting processes, reducing the magnitude of any pressure drops is beneficial.

Further, spacers have been described as being used to hold the heat exchange tubes of a heat exchanger substantially apart in order to facilitate the freezing of a thermal energy storage medium around the heat exchange tubes. However, spacers may cause obstructions in channels formed around the heat exchange tubes during an internal melt process. That is, spacers may block portions of the melt zone formed around the heat exchange tubes, thereby reducing the efficiency of an external melt process. As such, rather than using spacers, the heat exchange tubes may be interwoven such that the heat exchange tubes are held substantially apart. Alternatively, the heat exchange tubes may be formed of rigid plastic rods such that they may be welded to a header pipe in a spaced-apart manner.

In one embodiment, heat exchange tubes may be welded together into sections having substantially any width. By way of example, such sections may have widths which range between approximately two tube diameters to approximately 200 tube diameters or more.

In order to maintain flow channels, a hose material that is inflated with air may be implemented during the freezing of the heat exchange medium. The heat exchange medium may then be frozen around the inflated hose material. Deflating the hose material before melting the heat exchange medium may then create additional water flow channels without departing from the spirit or the scope of the present invention. Therefore, the present examples are to be considered as illustrative and not restrictive, and the invention is not to be limited to the details given herein, but may be modified within the scope of the appended claims.

What is claimed is:

1. A thermal energy storage system comprising:

a holding tank for holding a thermal energy storage medium, the holding tank having an inlet and an outlet;

a heat exchanger positioned within the holding tank, the heat exchanger being arranged to indirectly transfer heat between a heat exchange fluid that passes through the heat exchanger and the thermal energy storage medium;

a chiller arranged to cool the heat exchange fluid;

a cooler arranged to generate chilled air using a cooling fluid;

a first heat exchanger supply loop for delivering cooled heat exchange fluid from the chiller to the heat exchanger and for returning the heat exchange fluid from the heat exchanger to the chiller after passing through the heat exchanger;

a holding tank supply loop for delivering cooling fluid from the cooler to the holding tank such that when the thermal energy storage medium is present, the delivered cooling fluid directly contacts the thermal energy storage medium and for returning the cooling fluid from the holding tank to the cooler after passing through the holding tank; and a second heat exchanger supply loop for delivering warmed heat exchange fluid to the heat exchanger;

wherein the thermal energy storage system is arranged to cause the thermal energy storage medium to cycle between solid and liquid phases to facilitate the storage of energy, whereby when the thermal energy storage medium is in a solid phase, the heat exchange fluid delivered through the second heat exchanger supply loop may be used to form channels in the thermal energy storage medium via an internal melt process to facilitate more even melting of the thermal energy storage medium during an external melt process utilizing cooling fluid delivered through the holding tank supply loop.

2. A thermal energy storage system as recited in claim 1 further including a holding tank drain line for delivering cooled cooling fluid from the holding tank to the cooler to facilitate the generation of chilled air.

3. A thermal energy storage system as recited in claim 1 wherein the holding tank includes flow baffles arranged to facilitate the even melting of the thermal energy storage medium when the thermal energy storage medium is present.

4. A thermal energy storage system as recited in claim 1 wherein the second heat exchanger supply loop for delivering warmed heat exchange fluid to the heat exchanger is arranged to deliver the warmed heat exchange fluid through the chiller to the heat exchanger.

5. A thermal energy storage system as recited in claim 1 wherein the heat exchanger includes a plurality of heat exchange tubes, the heat exchange tubes being arranged to enable the heat exchange liquid to flow therethrough to cause a channel to be formed in the thermal energy storage medium substantially around each of the heat exchange tubes.

6. A thermal energy storage system as recited in claim 5 wherein the holding tank supply loop is arranged such that the delivered cooling fluid circulates over the thermal energy storage medium and through the channel formed in the thermal energy storage medium substantially around each of the heat exchange tubes.

7. A heat exchange system comprising:

a thermal energy storage medium;

a heat exchanger arranged to at least partially hold a heat exchange liquid, the heat exchanger further being arranged to indirectly transfer heat between the heat exchange liquid and the thermal energy storage medium, the heat exchanger being in communication with the thermal energy storage medium; and a fluid supply arranged to provide a fluid such that the fluid directly contacts the thermal energy storage medium to directly transfer heat between the fluid and the thermal energy storage medium, the fluid supply further being arranged to cooperate with the heat exchanger to efficiently transfer heat to the thermal energy storage medium, wherein the heat exchange system is arranged to cause the thermal energy storage medium to cycle between solid and liquid phases to facilitate the storage of energy, whereby when the thermal energy storage medium is in a solid phase, the heat exchange liquid may be used to shape the thermal energy storage medium via an internal melt process to facilitate more even melting of the thermal energy storage medium during an external melt process utilizing the fluid.

8. A heat exchange system as recited in claim 7 wherein the heat exchanger includes a plurality of heat exchange tubes, the heat exchange tubes being arranged to enable the heat exchange liquid to flow therethrough, wherein the indirect transfer of heat between the heat exchange liquid and the thermal energy storage medium is sufficient to cause a channel to be formed in the thermal energy storage medium substantially around each of the heat exchange tubes.

9. A heat exchange system as recited in claim 8 wherein the fluid supply is further arranged to provide the fluid such that the fluid circulates over the thermal energy storage medium and through the channel formed in the thermal energy storage medium substantially around each of the heat exchange tubes.

10. A heat exchange system as recited in claim 8 wherein the heat exchange tubes are formed from a thermoplastic material.

11. A heat exchange system as recited in claim 7 further including a cooling system in communication with the heat exchanger, wherein the cooling system is arranged to use the heat exchange liquid in the generation of chilled air.

12. A heat exchange system as recited in claim 11 wherein the cooling system is further arranged to use the fluid in the generation of chilled air.

13. A heat exchange system as recited in claim 7 further including:

a holding tank, the holding tank being arranged to contain the thermal energy storage medium;

an insulating layer arranged within the holding tank wherein the insulating layer insulates the thermal energy storage medium; and a baffle arranged within the holding tank, wherein the baffle extends into the thermal energy storage medium to facilitate the direct transfer of heat between the fluid and the thermal energy storage medium.

14. A heat exchange system as recited in claim 7 wherein the fluid supply is still further arranged to provide the fluid such that the fluid directly contacts the thermal energy storage medium after the heat exchanger indirectly transfers the heat between the heat exchange liquid and the thermal energy storage medium.

15. A thermal energy storage apparatus, the thermal energy storage apparatus being arranged to store thermal energy in a thermal energy storage medium, the thermal energy storage apparatus further being arranged to extract thermal energy from the thermal energy storage medium, the thermal energy storage apparatus comprising:

a first system arranged to store the thermal energy in the thermal energy storage medium when the first system is in a first configuration, wherein the thermal energy is stored by substantially freezing the thermal energy storage medium, the first system further being arranged to extract the thermal energy from the thermal energy storage medium when the first system is in a second configuration, wherein the thermal energy is extracted from the thermal energy storage medium by at least partially thawing the thermal energy storage medium; and a second system arranged to extract the thermal energy the thermal energy storage medium, wherein the second system cooperates with the first system to further thaw the thermal energy storage medium when the first system is in the second configuration.

16. A thermal energy storage apparatus as recited in claim 15 wherein the first system is an internal melt system, the internal melt system including a heat exchanger that is arranged to support both the first configuration and the second configuration.

17. A thermal energy storage apparatus as recited in claim 16 wherein the heat exchanger includes a pipe through which a heat exchange fluid is circulated, the heat exchange fluid being arranged to engage in a heat transfer process with the thermal energy storage medium.

18. A thermal energy storage apparatus as recited in claim 15 wherein the second system is an external melt system.

19. A thermal energy storage system comprising:
- a holding tank for holding a thermal energy storage medium, the holding tank having an inlet and an outlet;
- a heat exchanger positioned within the holding tank, the heat exchanger being arranged to indirectly transfer heat between a heat exchange fluid that passes through the heat exchanger and the thermal energy storage medium;
- a first heat exchanger supply loop for circulating cooled heat exchange fluid through the heat exchanger; and
- a second heat exchanger supply loop for delivering warmed heat exchange fluid to the heat exchanger, wherein the thermal energy storage system is arranged to cause the thermal energy storage medium to cycle between solid and liquid phases to facilitate the storage of energy, whereby when the thermal energy storage medium is in a solid phase, the warmed heat exchange fluid delivered through the second heat exchanger supply loop may be used to form channels in the thermal energy storage medium via an internal melt process to facilitate more even melting of the thermal energy storage medium during an external melt process.

20. A thermal energy storage system as recited in claim 19 wherein the holding tank includes flow baffles arranged to facilitate the even melting of the thermal energy storage medium when the thermal energy storage medium is present.

21. A thermal energy storage system as recited in claim 19 wherein the heat exchanger includes a plurality of heat exchange tubes, the heat exchange tubes being arranged to enable the heat exchange liquid to flow therethrough to cause a channel to be formed in the thermal energy storage medium substantially around each of the heat exchange tubes.

22. A thermal energy storage system as recited in claim 21 further including a holding tank supply loop, wherein the holding tank supply loop is arranged to deliver cooling fluid which circulates over the thermal energy storage medium and through the channel formed in the thermal energy storage medium substantially around each of the heat exchange tubes.

* * * * *